US007024745B1

(12) United States Patent
Mayer

(10) Patent No.: US 7,024,745 B1
(45) Date of Patent: Apr. 11, 2006

(54) FAN CLUTCH HOLDING TOOL

(75) Inventor: Shawn Mayer, Wind Lake, WI (US)

(73) Assignee: A&E Incorporated, Racine, WI (US)

(*) Notice: Subject to any disclaimer, the term of this patent is extended or adjusted under 35 U.S.C. 154(b) by 288 days.

(21) Appl. No.: 10/684,550

(22) Filed: Oct. 14, 2003

(51) Int. Cl.
*B23P 19/04* (2006.01)
*B25B 9/00* (2006.01)

(52) U.S. Cl. ................................ 29/402.08; 29/402.03; 29/426.1; 29/426.5; 81/13; 81/488

(58) Field of Classification Search ............. 29/402.03, 29/402.08, 426.1, 426.5; 81/13, 52, 55, 57.34, 81/57.35, 57.36, 57.41, 119, 186, 176.1, 176.15, 81/176.2, 487, 488
See application file for complete search history.

(56) References Cited

U.S. PATENT DOCUMENTS 154,445 A * 8/1874 Beecher ...................... 81/176.1
501,985 A * 7/1893 Armantrout .................. 81/100
1,261,006 A 4/1918 Bartelt
1,406,331 A 2/1922 Bartelt
1,528,892 A * 3/1925 Pigott et al. .................. 81/119
1,708,847 A * 4/1929 Norwood ........................ 81/52
1,788,169 A * 1/1931 Peterson ....................... 81/186
1,914,827 A * 6/1933 Hammerich .................... 81/13
2,394,808 A * 2/1946 Rohr .......................... 81/176.1
2,544,022 A * 3/1951 Johnson .......................... 81/13
2,645,960 A * 7/1953 Pray ................................ 81/13
3,094,020 A * 6/1963 Wise .............................. 81/13
3,706,244 A * 12/1972 Wilmeth ..................... 81/57.32
5,018,410 A * 5/1991 Farnsworth ..................... 81/13
5,188,008 A * 2/1993 States ............................. 81/13
5,428,853 A * 7/1995 Menke et al. .................. 7/138
5,887,497 A * 3/1999 Ensz ........................... 81/484
D412,272 S * 7/1999 Culberson et al. ............. D8/51
5,937,716 A * 8/1999 Klann .......................... 81/419
6,131,494 A * 10/2000 Quenneville ............... 81/125.1
6,334,375 B1 * 1/2002 Belcher ..................... 81/176.1
6,343,529 B1 * 2/2002 Pool ................................ 81/13
6,354,178 B1 * 3/2002 Pool et al. ..................... 81/463
6,640,670 B1 * 11/2003 Belcher ..................... 81/176.1
6,705,182 B1 * 3/2004 Bennett ..................... 81/176.2
6,912,936 B1 * 7/2005 Hume .......................... 81/119
2002/0029455 A1 * 3/2002 Armellini et al. .......... 29/426.5
2005/0012347 A1 * 1/2005 Smith et al. ............... 294/19.1

* cited by examiner

*Primary Examiner*—Essama Omgba
(74) *Attorney, Agent, or Firm*—Andrus, Sceales, Starke & Sawall, LLP

(57) ABSTRACT

A holding tool is adapted to be used in removing and replacing a fan clutch assembly threadably attached and detached relative to a shaft of a hub connected to a pulley on an internal combustion engine of a vehicle by a series of fasteners. The holding tool includes a flat holding plate in which a portion of the bottom edge is provided with arcuate edge adapted to surround a circumferential segment of the hub. The holding plate is formed with a plurality of spaced apart holes adapted to receive certain of the fasteners connecting the hub and pulley together so that the holding plate is attached to the hub. An elongated handle has a proximal end secured to the holding plate and a distal end adapted to rest upon a frame rail of the vehicle.

6 Claims, 3 Drawing Sheets

FAN CLUTCH HOLDING TOOL

FIELD OF THE INVENTION

The present invention relates generally to tools used in the removal or replacement of fan clutch assemblies relative to the shaft of a hub associated with a pulley. More particularly, the invention pertains to a one-piece, hands-free, holding tool used to maintain the hub and pulley in position as the fan clutch assembly is removed or replaced.

BACKGROUND OF THE INVENTION

Many internal combustion engines, especially truck engines, are constructed with a pulley and hub unit rotatably driven by a serpentine belt which also is entrained with the water pump, alternator and crankshaft pulleys. The hub typically includes a shaft which is threadably coupled to the nut of a fan clutch assembly defined by a fan clutch joined to a fan. Over time, rotation of the fan clutch assembly tends to tighten the connection between the nut and the hub shaft. When it is desired to break this connection, it can be a daunting task to remove the fan clutch assembly.

Heretofore, it has been common practice to employ a holding wrench and a turning wrench to effect the removal of the fan clutch assembly. Various sizes and styles of fan clutch assemblies usually require different sizes of holding and turning wrenches. In using such wrenches, it is necessary to place one of the user's hands on the holding wrench as the holding wrench engages the bolts or the nuts of the bolts attaching the hub and pulley together. The other hand of the user is applied to the turning wrench as the turning wrench grasps the nut on the fan clutch assembly. Both hands of the user are required to manipulate the respective wrenches so as to break the threaded connection between the nut and hub shaft. Because this can be a stubborn connection to break, it is sometimes necessary for one user to engage the holding wrench while another user forces the turning wrench with one hand and assists the turning by hitting the turning wrench with a hammer held in the other hand. When replacing a fan clutch assembly, the user must again place one hand on the holding wrench and the other hand on the turning wrench. It should be appreciated that removal and replacement of the fan clutch assembly can be a labor intensive task which may require as many as three hands and a pair of wrench users.

Accordingly, it is desirable to overcome the shortcomings of the prior art in an effort to simplify fan clutch assembly removal and replacement. It is further desirable to provide a holding wrench which, in use, will free up one of the user's hands so that both hands may be applied to the rotating of the turning wrench. With such holding wrench, a single user is capable of effecting the necessary fan clutch assembly maintenance.

SUMMARY OF THE INVENTION

It is one object of the present invention to provide an improved fan clutch holding tool or wrench and an associated method of removing a fan clutch assembly from a hub shaft using such tool.

It is also an object of the present invention to provide a one piece holding tool or wrench capable of being used on pulleys having six bolt or four bolt designs in which the pulley and hub are held together.

It is a further object of the present invention to provide a hands-free, holding tool or wrench which will enable a user to place both hands on a turning wrench when effecting removal of a fan clutch assembly.

It is another object of the present invention to provide a fan clutch holding tool or wrench which is simple, economical, easy to use and constructed without any moving parts.

In one aspect of the invention, a holding tool is adapted to be used in removing and replacing of fan clutch assembly threadably attached and detached relative to a shaft of a hub connected to a pulley on an internal combustion engine of a vehicle by a series of fasteners. The holding tool includes a flat holding plate having at least a top edge and a bottom edge. A portion of the bottom edge is provided with an arcuate edge adapted to surround a circumferential segment of the hub. The holding plate is formed with a plurality of spaced apart holes adapted to receive certain of the fasteners connecting the hub and the pulley together so that the holding plate is attached to the hub. An elongated handle has a proximal end secured to the holding plate and a distal end adapted to rest upon a frame rail of the vehicle. The tool is a rigid, one-piece construction. In the preferred embodiment, the holding plate is provided with five holes, each hole being spaced radially from a centerline axis of the shaft of the hub. The pulley is connected to the hub by six bolts, and three alternating holes of the five holes are adapted to receive three of the six bolts.

In another aspect of the invention, there is contemplated a method for removing or replacing a fan clutch assembly of the type having a nut threaded on a shaft of a hub joined to a pulley on an internal combustion engine of a vehicle by a series of consecutively spaced fasteners passed into openings formed in the pulley and threaded into apertures in the hub aligned with the openings. The method includes the steps of providing a holding wrench including a holding plate with an arcuate edge and a plurality of holes formed therethrough, and an elongated handle having a distal end and a proximal end joined to the holding plate, the holes being alignable with the pulley openings and the hub apertures; removing a certain number of the fasteners from certain of the pulley openings and the hub apertures such that the hub remains joined to the pulley; placing the holding plate against the pulley such that the arcuate edge surrounds an upper circumferential segment of the hub and certain of the holes are aligned with certain of the pulley openings and hub apertures; replacing the certain number of the fasteners by passing the certain number of fasteners through the aligned certain of the holes in the holding plate and the pulley openings, and threading the fasteners into the aligned hub apertures so as to connect the holding plate to the pulley and the hub; manually turning the engine to cause rotation of the connected holding wrench such that the distal end of the handle will rest upon a frame rail of the vehicle and enable the holding wrench to be self held; providing a turning wrench on the nut of the fan clutch assembly to tightly grip the nut; and manually pivoting the turning wrench about the nut while the holding wrench is self held to loosen and remove the nut from the hub shaft or replace the nut on the hub shaft as desired. The step of manually pivoting the turning wrench includes manually engaging the turning wrench while hitting the turning wrench with a hammer.

Various other objects, features and advantages of the invention will be made apparent from the following description taken together with the drawings.

BRIEF DESCRIPTION OF THE DRAWINGS

The drawings illustrate the best mode presently contemplated of carrying out the invention.

In the drawings.

DETAILED DESCRIPTION OF THE INVENTION

Figure 1:
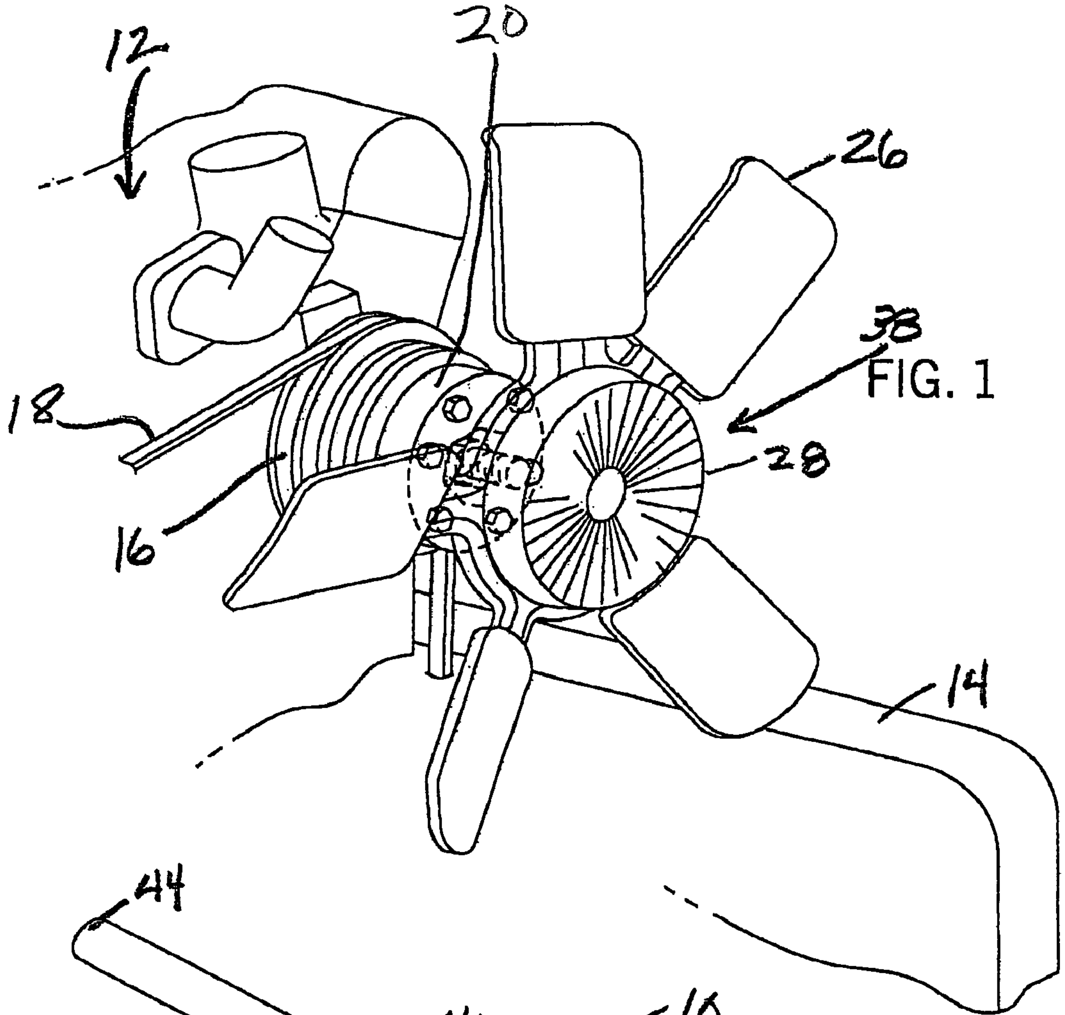
FIG. 1 is a perspective view of a typical assembled fan clutch assembly in which the holding tool of the present invention is utilized.
Figure 2:
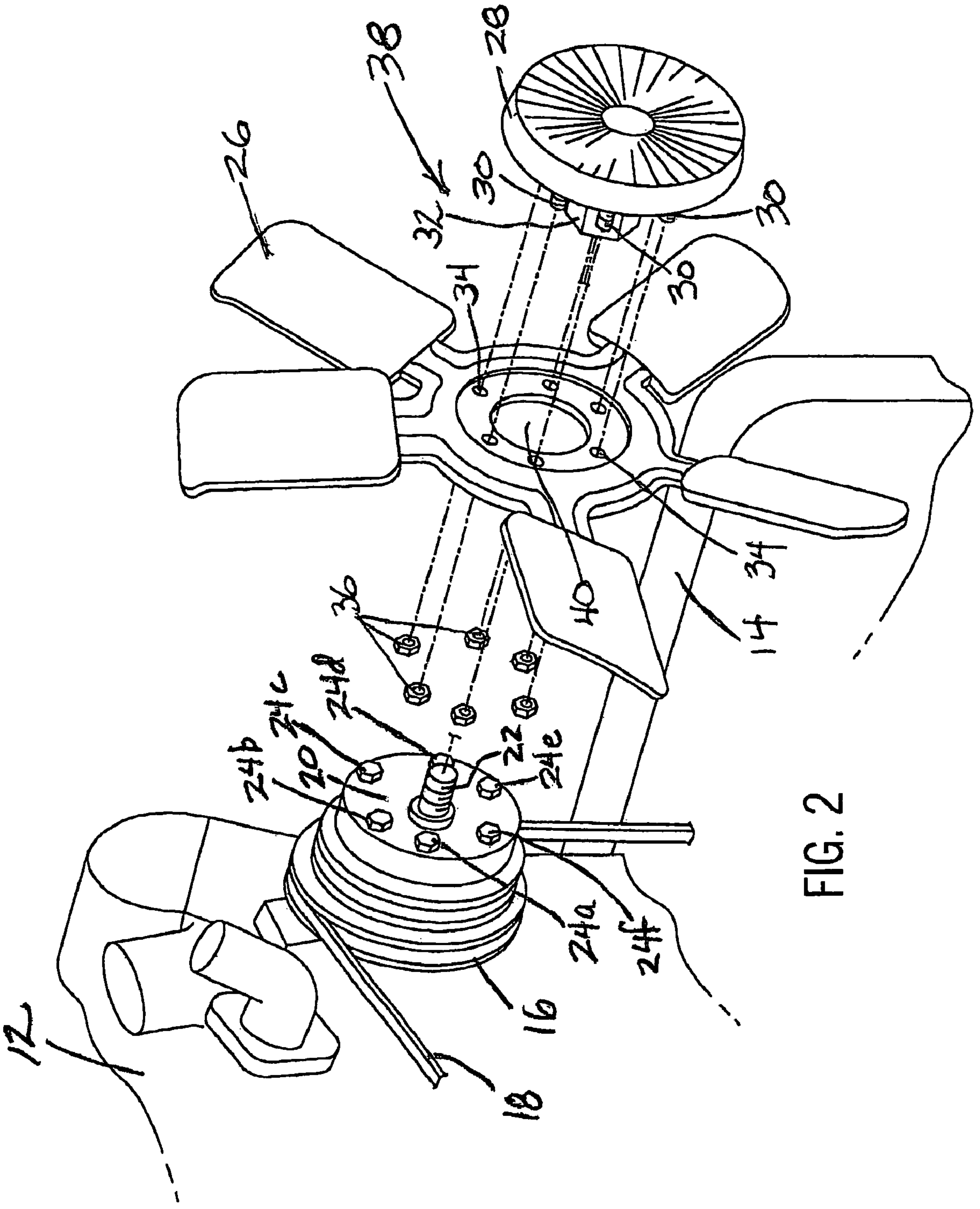
FIG. 2 is a perspective view of the disassembled fan clutch assembly shown in FIG. 1.

Referring now the drawings, FIGS. 1 and 2 depict a typical environment wherein a holding tool 10 embodying the present invention is used. Both figures illustrate a vehicle internal combustion engine 12 which is flanked on either side by a supportive frame rail of the vehicle, one of which is seen at 14. Engine 12 includes a rotatable fan pulley 16 entrained by a serpentine belt 18 which normally is also wound around crankshaft, water pump and alternator pulleys (not shown). Located behind the pulley 16 is a hub 20 having a threaded shaft 22 protruding therefrom. In the preferred embodiment, six spaced apart bolts 24*a–f* protrude from a face of the pulley 16 and are utilized to fasten the pulley 16 and the hub 20 together. The bolts 24*a–f* are further utilized to attach the holding tool 10 as will be explained hereafter. It should be understood that certain other pulleys carry four bolts to connect the pulley 16 and the hub 20 and that the present invention further contemplates this design as will be further explained below.

A fan 26 is joined to a fan clutch 28 in the form of a viscous coupling. The rear of the clutch 28 is provided with six spaced bolts 30 and a nut 32. The bolts 30 extend through appropriate openings 34 formed in a central portion of the fan 26 and are fixedly held thereto by means of a set of nuts 36 screwed onto threaded ends of the bolts 30. Together the fan 26 and the clutch 28 define a fan clutch assembly 38. The nut 32 projects through a central opening 40 in the fan 26 and is threadably secured to the hub shaft 22. The lengths of the hub shaft 22 and the nut 32 along with the depth of the attached fan 26 define a limited distance between the fan clutch assembly 38 and the pulley 16 when these two components are interconnected. This limited distance makes it difficult to remove the fan clutch assembly 38 from the hub shaft 22.

Previously, a fixed size or adjustable jaw holding wrench would be placed over the heads of bolts 24*a–f* or nuts on the ends of bolts. A separate turning wrench was used to engage the sides of the clutch nut 32. As described in the Background of the Invention, at least two hands were needed to manipulate the holding of turning wrenches of the prior art relative to each other in order to effect removal of the fan clutch assembly 38. Because of the differing bolt configurations on hubs, multiple sets of holding wrenches have typically been required to remove the nut 32 of the hub shaft 22 for different types of vehicles.

Figure 3:
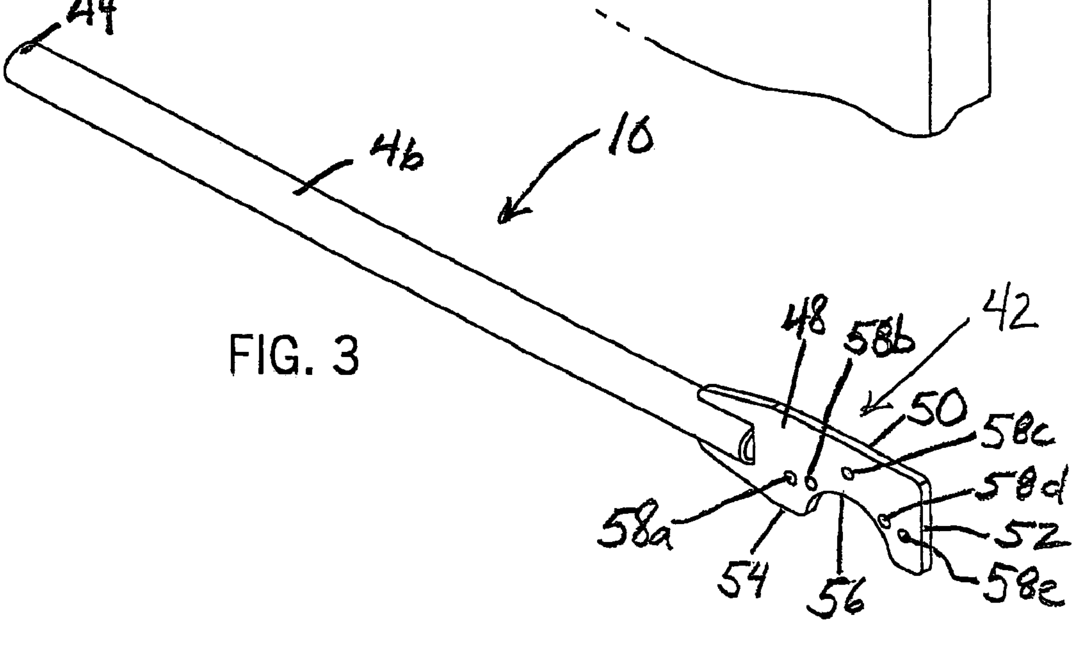
FIG. 3 is a perspective view of the holding tool embodying the present invention.

FIG. 3 illustrates the versatile holding wrench or tool 10 which may be used in place of multiple holding wrenches previously required, and which eliminates the need for one of the user's hands during actual removal of the fan clutch assembly 38 from the hub shaft 22. Holding tool 10 is comprised of a rigid metal material having a working end 42 and a rest end 44 connected by an elongated cylindrical handle 46. Working end 42 includes a flat holding plate 48 having a top edge 50, a side edge 52 and a bottom edge 54. A portion of the bottom edge 54 is formed with arcuate edge 56 particularly shaped to surround the upper circumferential segment of the hub 20 which is generally of universal size. The holding plate 48 is drilled with a series of five spaced apart holes 58*a–e* of the same size for receiving, in this case, three 24*a, b, c* of the six bolts 24*a–f*. The holes 58*a–e* are all spaced radially from the centerline axis of the hub shaft 22 when the arcuate edge 56 on holding plate 48 surrounds the upper hub periphery. Alternating holes 58*a, c, e* are used in the six bolt pulley design in the preferred embodiment, whereas holes 58*b, d*, would be used with two bolts of the four bolt pulley design (not shown).

Figure 4:
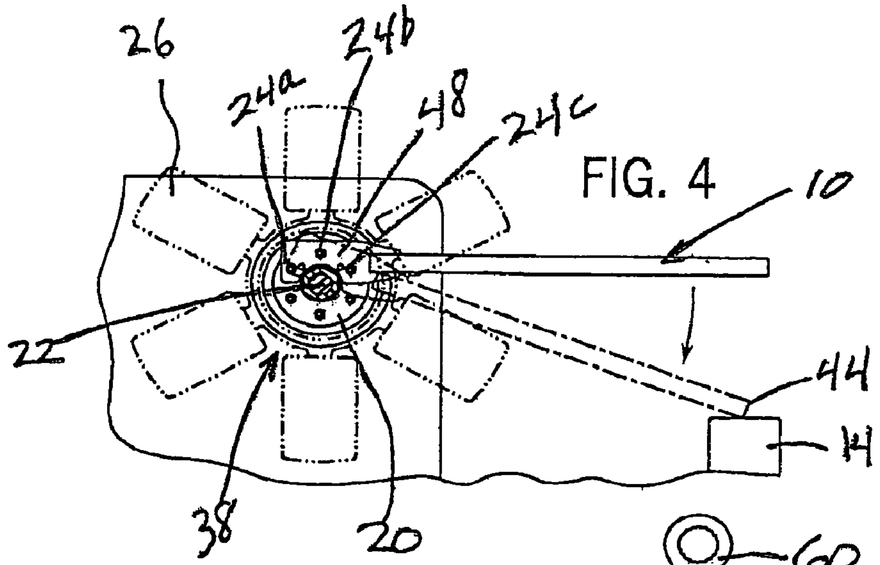
FIG. 4 is a front view of the fan clutch assembly partially broken away to show use of the holding tool.

In use, with the engine 12 deactivated such as by disconnecting the battery, only the uppermost three bolts 24*a, b, c* are removed from the hub 20 by employing a standard tool (not shown). The remaining three bolts 24*d, e, f* maintain the connection between the hub 20 and the pulley 16. To begin fan clutch removal, the arcuate edge 56 of the tool 10 is placed around the hub periphery. At the same time, holes 58*a, c, e* on the holding plate 48 of the tool 10 are aligned with corresponding holes in the pulley face created by the removal of the bolts 24*a, b, c*. Next, the bolts 24*a, b, c* are reattached according to the specified torque to secure the holding plate 48 to the pulley face as shown in FIG. 4. In this position, the handle 46 of the tool 10 extends generally to the right and is spaced above the frame rail 14 of the vehicle. The engine 12 is then manually turned such as by loosening the belt or barring over the engine 12 so as to freely rotate the tool 10, pulley 16 and hub 20 clockwise until the rest end 44 of the tool handle 46 contacts the frame rail 14. In this working example, the threads on the hub shaft 22 are of the left hand or counterclockwise type. Once the holding plate 48 has been attached to the hub 20, there is no need to manually handle the holding tool 10 as was previously required so that both hands of the tool user are available to more easily effect removal of the fan clutch assembly 38.

Figure 5:
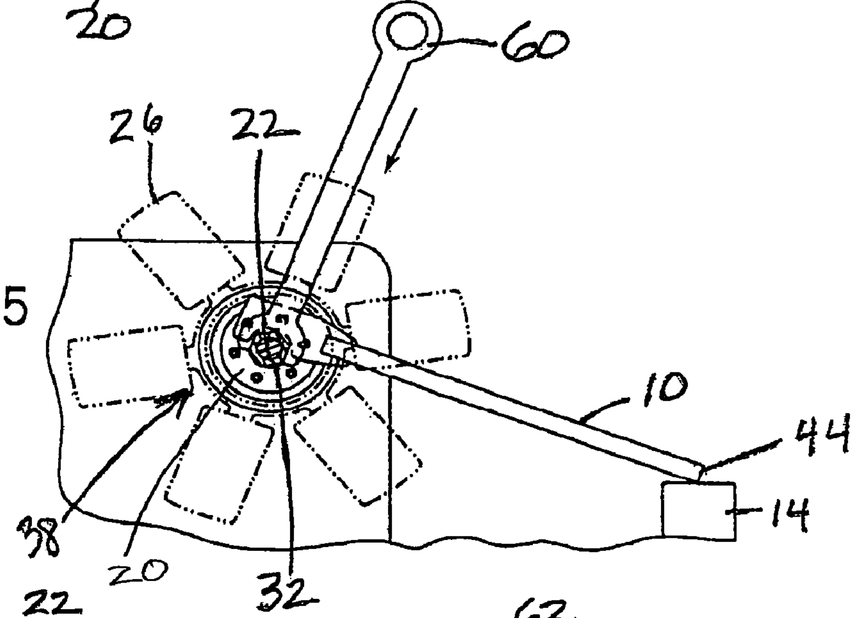
FIG. 5 is a front view similar to FIG. 4 showing use of a turning wrench once the holding tool is in place in order to effect separation of a fan clutch assembly from a fan hub.
Figure 6:
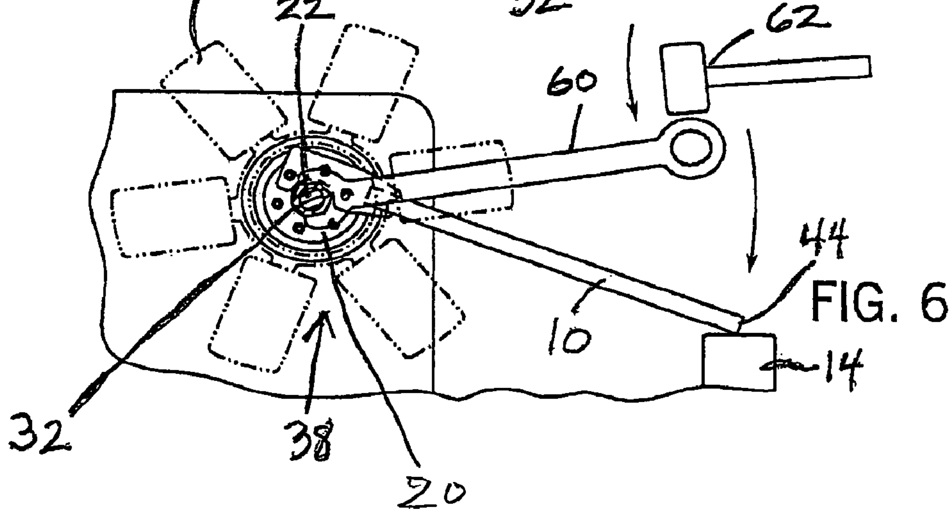
FIG. 6 is a front view similar to FIG. 5 showing the use of a hammer and the turning wrench.

As seen in FIG. 5, the user lastly engages the nut 32 on the fan clutch 28 with an appropriate open end turning wrench 60 and forcefully turns this wrench 60 clockwise relative to the held pulley 16 with both hands so as to unthread the nut 32 and remove the fan clutch assembly 38 from the hub shaft 22. In the event the nut 32 is difficult to turn, as is frequently the case, the user holds the turning wrench 60 in one hand and impacts the wrench 60 using a hammer 62 with the other hand as shown in FIG. 6.

The holding tool 10 is equally useful in four bolt pulley designs and operates in the same manner. Where the hub shaft 22 is formed with right hand or clockwise threads, the holding tool 10 is applied to the pulley 16 and hub 20 from the left of the engine 12 so that the rest end 44 is supported on the opposite or left frame rail. The turning wrench 60 is then operated in a counterclockwise direction. The holding tool 10 could be utilized when it is desired to tighten the nut 32 on the replacement fan clutch assembly 38.

While the invention has been described with reference to a preferred embodiment, those skilled in the art will appreciate that certain substitutions, alterations and omissions may be made without departing from the spirit thereof. Accordingly, the foregoing description is meant to be exemplary only and should not be deemed limitative on the scope of the invention set forth with the following claims.

I claim:

1. A fan clutch holding tool used in combination with a fan clutch assembly threadably attached to a shaft of a hub connected to a pulley on an internal combustion engine of a vehicle by a series of fasteners, the holding tool comprising:

a flat holding plate having at least a top edge and a bottom edge, a portion of the bottom edge being provided with an arcuate edge engageable with circumferential segment of the hub, the holding plate being formed with a plurality of spaced apart holes receiving certain of the fasteners connecting the hub and pulley together so that the holding plate is attached to the hub; and an elongated handle having a proximal end secured to the holding plate and a distal end supported upon a frame rail of the vehicle.

2. The holding tool of claim 1, wherein the tool is a rigid, one-piece construction.

3. The holding tool of claim 1, wherein the holding plate is provided with five holes, each hole being spaced radially from a centerline axis of the shaft of the hub when the arcuate edge surrounds the circumferential segment of the hub.

4. The holding tool of claim 3, wherein the pulley is connected to the hub by six bolts, and three alternating holes of the five holes receive three of the six bolts.

5. A method for removing or replacing a fan clutch assembly of the type having a nut threaded on a shaft of a hub joined to a pulley formed with openings on an internal combustion engine of a vehicle by a series of consecutively spaced fasteners passed in the openings formed in the pulley and threaded into apertures in the hub aligned with the openings, the method comprising the steps of:

providing a holding wrench including a holding plate with an arcuate edge and a plurality of holes formed therethrough, and an elongated handle having a distal end and a proximal end joined to the holding plate, the holes being alignable with the pulley openings and the hub apertures;

removing a certain number of the fasteners from certain of the pulley openings and the hub apertures such that the hub remains joined to the pulley;

placing the holding plate against the pulley such that the arcuate edge surrounds a circumferential segment of the hub and certain of the holes are aligned with certain of the pulley openings and hub apertures;

replacing the certain number of the fasteners by passing the certain number of fasteners through the aligned certain of the holes in the holding plate and the pulley openings, and threading the fasteners into the aligned hub apertures so as to connect the holding plate to the pulley and the hub;

manually turning the engine to cause rotation of the holding wrench such that the distal end of the handle will rest upon a frame rail of the vehicle and enable the holding wrench to be self held;

providing a turning wrench on the nut of the fan clutch assembly to tightly grip the nut; and manually pivoting the turning wrench about the nut while the holding wrench is self held to loosen and remove the nut from the hub shaft or replace the nut on the hub shaft as desired.

6. The method of claim 5, wherein the step of manually pivoting the turning wrench includes manually engaging the turning wrench while hitting the turning wrench with a hammer.

* * * * *